(12) United States Patent
Zhu et al.

(10) Patent No.: US 10,630,969 B2
(45) Date of Patent: Apr. 21, 2020

(54) METHOD AND DEVICE FOR DETECTING DIGITAL CAMERA

(71) Applicant: Beijing Smarter Eye Technology Co. Ltd., Beijing (CN)

(72) Inventors: Haitao Zhu, Beijing (CN); Ran Meng, Beijing (CN); Feng Cui, Beijing (CN); Qiwei Xie, Beijing (CN); An Jiang, Beijing (CN)

(73) Assignee: BEIJING SMARTER EYE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/465,333

(22) Filed: Mar. 21, 2017

(65) Prior Publication Data

US 2019/0349577 A1   Nov. 14, 2019

(30) Foreign Application Priority Data

Jan. 21, 2016   (CN) .......................... 2016 1 0041494

(51) Int. Cl.
*H04N 17/00*   (2006.01)
*G02B 7/36*   (2006.01)
(Continued)

(52) U.S. Cl.
CPC .............. *H04N 17/002* (2013.01); *G02B 7/36* (2013.01); *G06T 7/0004* (2013.01);
(Continued)

(58) Field of Classification Search
CPC .. H04N 17/002; H04N 5/2351; H04N 5/2353; H04N 13/398; G02B 7/36;
(Continued)

(56) References Cited

U.S. PATENT DOCUMENTS

| | | | | |
|---|---|---|---|---|
| 5,023,649 A | * | 6/1991 | Hayashi | G03B 7/09979 396/234 |
| 6,600,461 B1 | * | 7/2003 | Okauchi | G02B 27/017 345/8 |
| 2014/0286527 A1 | * | 9/2014 | Harthattu | G06K 9/00228 382/103 |

OTHER PUBLICATIONS

Canon PowerShot Camera User Guide, Canon, 2015 http://gdlp01.c-wss.com/gds/8/0300020268/01/psg9x-cu-en.pdf (Year: 2015).*

* cited by examiner

*Primary Examiner* — Jianxun Yang
(74) *Attorney, Agent, or Firm* — Novick, Kim & Lee, PLLC; Allen Xue

(57) ABSTRACT

The present disclosure provides a detection method and a detection device for a digital camera. The detection method includes: Step 1 of moving the to-be-detected auto-focusing lens assembly to a position spaced apart from a subject by a first distance; Step 2 of performing automatic exposure control until an average luminance value of a central region of an image is in a stable state; Step 3 of locking an automatic exposure control parameter; Step 4 of taking a first image; Step 5 of determining sizes of four corner regions in the first image; Step 6 of counting average luminance values of the four corner regions; and Step 7 of, in the case that the average luminance values of the four corner regions are identical to each other, determining that the to-be-detected auto-focusing lens assembly is installed at an accurate position. According to the present disclosure, it is able to detect where or not the auto-focusing lens assembly is installed at the accurate position in an automatic and efficient manner.

12 Claims, 3 Drawing Sheets

(51) Int. Cl.
*G06T 7/00* (2017.01)
*H04N 5/235* (2006.01)

(52) U.S. Cl.
CPC ......... *H04N 5/2351* (2013.01); *H04N 5/2353* (2013.01); *G06T 2207/30168* (2013.01)

(58) Field of Classification Search
CPC .............. G02B 27/017; G02B 27/0172; G02B 27/0176; G06T 7/0004; G06T 2207/30168; G06K 9/00228; G06K 9/6257; G09G 3/001; G03B 7/09979
See application file for complete search history.

METHOD AND DEVICE FOR DETECTING DIGITAL CAMERA

CROSS REFERENCE TO RELATED APPLICATIONS

This application is related to and claims the benefit of Chinese Patent Application Number 201610041494.7, filed on Jan. 21, 2016, the contents of which are herein incorporated by reference in their entirety.

TECHNICAL FIELD

The present disclosure relates to the field of camera technology, in particular to a detection method and a detection device for a digital camera.

BACKGROUND

Along with the development of smart hardware, digital cameras having an auto-focusing function have become more and more popular. Although the digital cameras are detected before them leave the factory, lens assemblies may be damaged during the delivery and assembly, e.g., the lens assemblies may not be installed at an accurate position.

Currently, the lens assemblies are detected manually one by one. This detection method is time-consuming, labor-consuming and expensive, and meanwhile no uniform detection standard may be applied.

Hence, there is an urgent need to provide a scheme so as to overcome the above-mentioned defects.

SUMMARY

A main object of the present disclosure is to provide a detection method and a detection device for a digital camera, so as to at least partially solve the problem about how to automatically and efficiently detect whether or not an auto-focusing lens assembly is installed at an accurate position.

In one aspect, the present disclosure provides in some embodiments a detection method for a digital camera, the digital camera including an auto-focusing lens assembly, the detection method including: Step 1 of moving the to-be-detected auto-focusing lens assembly to a position spaced apart from a subject by a first distance; Step 2 of performing automatic exposure control until an average luminance value of a central region of an image is in a stable state; Step 3 of locking an automatic exposure control parameter; Step 4 of taking a first image; Step 5 of determining sizes of four corner regions in the first image; Step 6 of counting average luminance values of the four corner regions; and Step 7 of, in the case that the average luminance values of the four corner regions are identical to each other, determining that the to-be-detected auto-focusing lens assembly is installed at an accurate position.

In another aspect, the present disclosure provides in some embodiments a detection device for a digital camera, the digital camera including an auto-focusing lens assembly, the detection device at least including: a first movement module configured to move the to-be-detected auto-focusing lens assembly to a position spaced apart from a subject by a first distance; an exposure module configured to perform automatic exposure control until an average luminance value of a central region of an image is in a stable state; a locking module configured to lock an automatic exposure control parameter; a first image taking module configured to take a first image; a first determination module configured to determine sizes of four corner regions in the first image; a first counting module configured to count average luminance values of the four corner regions; and a second determination module configured to, in the case that the average luminance values of the four corner regions are identical to each other, determine that the to-be-detected auto-focusing lens assembly is installed at an accurate position.

As compared with the related art, the above-mentioned technical solutions at least have the following beneficial effects.

According to the embodiments of the present disclosure, the to-be-detected auto-focusing lens assembly may be moved to the position spaced apart from the subject by the first distance. Next, the automatic exposure control may be performed, until the average luminance value of the central region of the image is in the stable state. The automatic exposure control parameter may be locked, and the first image may be taken. Next, the sizes of the four corner regions in the first image may be determined, and the average luminance values of the four corner regions may be counted. In the case that the average luminance values of the four corner regions are identical to each other, it may be determined that the to-be-detected auto-focusing lens assembly is installed at the accurate position. As a result, it is able to automatically and efficiently detect whether or not the auto-focusing lens assembly is installed at the accurate position.

It should be appreciated that, the products in the embodiments of the present disclosure are unnecessarily to have all the above-mentioned beneficial effects at the same time.

The other features and advantages of the present disclosure will be described in the following, and they will partially become more apparent from the description or they will be understood through the implementation of the present disclosure. The objects and the other advantages of the present disclosure may be realized and acquired through methods specified in the description, the drawings and the appended claims.

It should be appreciated that, the summary is not intended to include all necessary technical features of the subject matters to be protected in the embodiments of the present disclosure, nor to define a scope of the present disclosure. The subject matters to be protected in the embodiments of the present disclosure are not limited to overcome any or all defects mentioned in the background.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the present disclosure. Obviously, the following drawings merely relate to some embodiments of the present disclosure, and based on these drawings, a person skilled in the art may obtain the other drawings without any creative effort. In these drawings.

In these drawings, a reference sign 1 represents a light-emitting diode (LED) light source, a reference sign 2 represents an auto-focusing lens assembly, a reference sign 3 represents a lens, and a reference sign 4 represents a red-green-blue (RGB) sensor.

These drawings and the descriptions thereof are not intended to limit a scope of the present disclosure in any way, and instead, a concept of the present disclosure may be apparent with reference to specific embodiments.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other equivalent or modified embodiments, which also fall within the scope of the present disclosure. These embodiments may be achieved in accordance with various ways defined and included in the appended claims.

It should be appreciated that, in the following description, many details are given so as to facilitate the understanding of the present disclosure. Obviously, the implementation of the present disclosure may be achieved without these details.

It should be further appreciated that, the embodiments and the technical features therein may be combined with each other to form technical solutions, in the case of no specific definition or no conflict.

Figure 1:
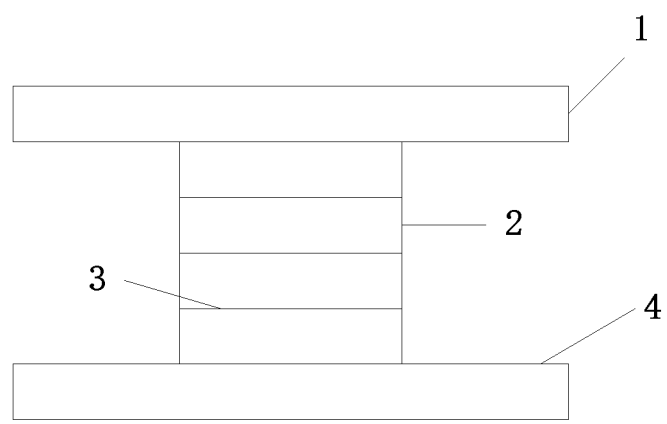
FIG. 1 is a schematic view showing an application scenario according to one embodiment of the present disclosure.

FIG. 1 illustratively shows an application scenario where a product in the embodiments of the present disclosure is to be used. An LED light source 1 is a uniform, white LED light source, which is capable of emitting uniform light beams parallel to each other. The LED light source 1 is arranged on an auto-focusing lens assembly 2 of a digital camera. A lens 3 is capable of moving within the auto-focusing lens assembly 2, and the auto-focusing lens assembly 2 is connected to a RGB sensor 4.

Figure 2:
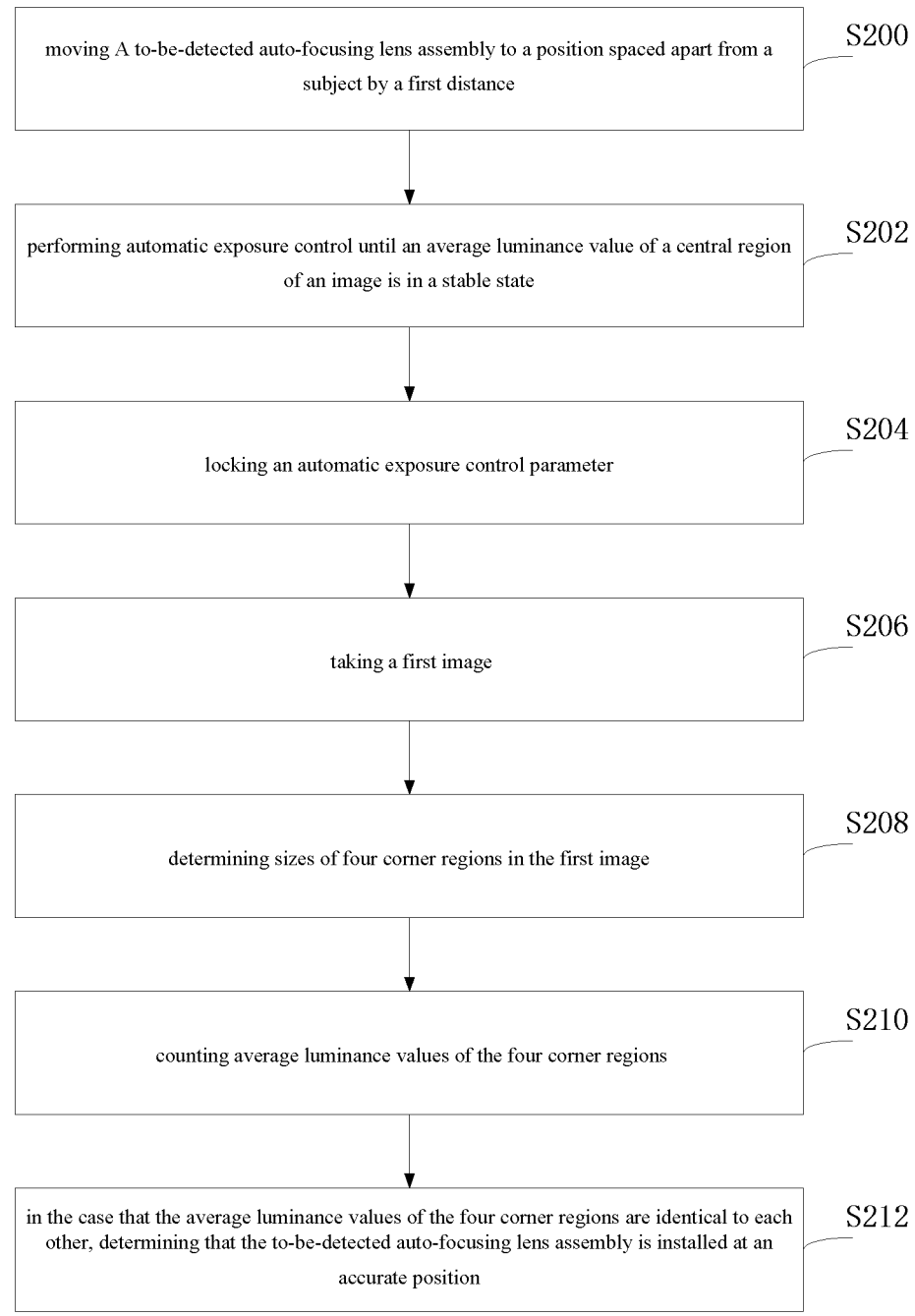
FIG. 2 is a flow chart of a detection method for a digital camera according to one embodiment of the present disclosure.

In order to automatically and efficiently detect whether or not the auto-focusing lens assembly is installed at an accurate position, the present disclosure provides in some embodiments a detection method for a digital camera. The digital camera includes an auto-focusing lens assembly. As shown in FIG. 2, the detection method may include the following Steps S200 to S212.

Step S200: moving a to-be-detected auto-focusing lens assembly to a position spaced apart from a subject by a first distance.

The to-be-detected auto-focusing lens assembly may be moved by setting a relevant register. The first distance refers to a minimum distance between the to-be-detected auto-focusing lens assembly and the subject. The to-be-detected auto-focusing lens assembly may be maintained at the position.

Step S202: performing automatic exposure control until an average luminance value of a central region of an image is in a stable state.

In the case of performing the automatic exposure control, this step may be completed by the digital camera. The average luminance value of the central region of the image may be gradually converged to a predetermined range, and after a certain time period it may be in the stable state, i.e., the average luminance value is not changed significantly. At this time, the automatic exposure control is in the stable state, and the exposure may be converged.

The average luminance value of the central region of the image may be measured through an area exposure measurement method. The luminance values of the entire image fall within the range of 0 to 255. In a possible embodiment of the present disclosure, the predetermined range may be 170 to 180. In the case that the average luminance value of the central region is within the predetermined range for more than 500 ms, the automatic exposure control is in the stable state, and the exposure may be converged.

Step S204: locking an automatic exposure control parameter.

After the exposure has been converged, the automatic exposure control parameter may be locked, and the exposure parameter may not be adjusted any more. The exposure parameter may include exposure time, gain and aperture size.

Step S206: taking a first image.

In this step, the first image may be taken by the digital camera after the automatic exposure control parameter has been locked. Because the first image is taken after the automatic exposure control parameter has been locked, the average luminance value of the central region of the image measured through the area exposure measurement method is just an average luminance value of a central region of the first image. The first image will be analyzed hereinafter.

Step S208: determining sizes of four corner regions in the first image.

In this step, each of the four corner regions may have a length one tenth of a length of the image, and a width one tenth of a width of the image. The central region may have a length one fifth of the length of the image, and a width one fifth of the width of the image.

Step S210: counting average luminance values of the four corner regions.

Through the analysis on the first image, it is able to count the average luminance values of the four corner regions in the first image.

Step S212: in the case that the average luminance values of the four corner regions are identical to each other, determining that the to-be-detected auto-focusing lens assembly is to installed at an accurate position.

For the auto-focusing lens assembly installed at the accurate position, due to the existence of lens shading, a luminance value of the central region of the image is relatively large, and luminance values of the four corner regions are relatively small, resulting in an obvious difference in the luminance distribution. Hence, whether or not the to-be-detected auto-focusing lens assembly of the digital camera is installed at the accurate position may be determined by detecting whether or not the average luminance values of the four corner regions in the first image are identical to each other.

Based on the above, the detection method may further include, in the case that the average luminance values of the four corner regions are not identical to each other, determining that the to-be-detected auto-focusing lens assembly is not installed at the accurate position.

During the detection of the digital camera, the auto-focusing lens assembly may fall off from the digital camera. In a possible embodiment of the present disclosure, the detection method may further include the following steps.

Step S214: counting an overall average luminance value of the four corner regions in the first image.

Step S216: calculating a ratio of the overall average luminance value of the four corner regions to the average luminance value of the central region, to acquire a first luminance ratio.

For example, in the case that the average luminance values of the four corner regions in the first image are represented by A, B, C and D, and the average luminance value of the central region in the first image is represented by E, the first luminance ratio may be calculated in accordance with $$\frac{(A+B+C+D)}{4 \times E}.$$

It should be appreciated that, the above example is merely for illustrative purpose, but shall not be construed as limiting the scope of the present disclosure.

Step S218: in the case that the first luminance ratio is within a first predetermined range, determining that the to-be-detected auto-focusing lens assembly does not fall off from the digital camera. The first predetermined range may be determined by steps of: calculating, with respect to a batch of digital camera samples, the first luminance ratios of these samples through Steps S200 to S210 and S214 to S216; and calculating normal distribution of the first luminance ratios of these samples, so as to acquire the first predetermined range.

The digital camera sample is a sample where the auto-focusing lens assembly is installed at the accurate position. In a possible embodiment of the present disclosure, the first predetermined range is 30% to 40%. In the case that the first luminance ratio of the to-be-detected auto-focusing lens assembly falls within the range of 30% to 40%, it means that the to-be-detected auto-focusing lens assembly does not fall off from the digital camera.

Based on the above, the detection method may further include, in the case that the first luminance ration is not within the first predetermined range, determining that the to-be-detected auto-focusing lens assembly has fallen off from the digital camera.

For example, in the case that the first luminance ratio of the to-be-detected auto-focusing lens assembly is not within the range of 30% to 40%, it means that the to-be-detected auto-focusing lens assembly has fallen off from the digital camera.

During the detection, a spring in the auto-focusing lens assembly may fall off from the digital camera. This spring is configured to be telescopic so as to move the lens, thereby to change light quantity. Hence, in the case that the automatic exposure control parameter remains unchanged, the luminance may change along with the light amount. In a possible embodiment of the present disclosure, subsequent to Step S206, the detection method may further include the following steps.

Step S2061: moving the to-be-detected auto-focusing lens assembly to a position farthest away from the subject. The to-be-detected auto-focusing lens assembly may be moved to the position farthest away from the subject by setting the relevant register.

Step S2062: taking a second image. In this step, the second image may be taken at the position where the to-be-detected auto-focusing lens assembly is located farthest away from the subject in the case that the automatic exposure control parameter is locked.

Step S2063: determining an average luminance value of a central region of a second image. In the case of taking the second image, the auto-focusing lens assembly is moved to the position farthest away from subject, so a focus point is located at a position closest to the digital camera. At this time, the light amount is relatively small. Through the analysis on the second image, it is able to acquire the average luminance value of the central region of the second image.

Step S2064: calculating a ratio of the average luminance value of the central region of the second image to the average luminance value of the central region of the first image, so as to acquire a second luminance ratio.

For example, in the case that the average luminance value of the central region of the first image and the average luminance value of the central region of the second image are represented by luminance 1 and luminance 2 respectively, the second luminance ratio may be calculated in accordance with $$\frac{luminance2}{luminance1}.$$

It should be appreciated that, the above example is merely for illustrative purpose, but shall not be construed as limiting the scope of the present disclosure.

Step S2065: in the case that the second luminance ratio is within a second predetermined range, determining that the spring in the to-be-detected auto-focusing lens assembly does not fall off from the digital camera. The second predetermined range may be determined through the following steps: with respect to a batch of digital camera samples, calculating the second luminance ratios of these samples through Steps S200 to S206 and S2061 to S2064; and calculating normal distribution of the second luminance ratios of these samples, so as to determine the second predetermined range.

In a possible embodiment of the present disclosure, the second predetermined range is 60% to 70%. In the case that the second luminance ratio falls within the range of 60% to 70%, it means that the spring in the to-be-detected auto-focusing lens assembly does not fall off from the digital camera.

Based on the above, the detection method may further include, in the case that the second luminance ratio is not within the second predetermined range, determining that the spring in the to-be-detected auto-focus lens assembly has fallen off from the digital camera.

For example, in the case that the second luminance ratio of the to-be-detected auto-focusing lens assembly is not within the range of 60% to 70%, it means that the spring in the to-be-detected auto-focusing lens assembly has fallen off from the digital camera.

In a possible embodiment of the present disclosure, the detection method may further include: manually detecting the to-be-detected auto-focusing lens assembly which does not fall off from the digital camera and the spring in which does not fall off from the digital camera; and adjusting the first predetermined range and the second predetermined range in accordance with a detection result.

The to-be-detected auto-focusing lens assembly which does not fall off from the digital camera and the spring in which does not fall off from the digital camera may be manually detected, and meanwhile the first predetermined range and the second predetermined range may be adjusted, so as to improve the detection accuracy.

According to the embodiments of the present disclosure, it is able to efficiently detect whether or not the auto-focusing lens assembly is installed at the accurate position, whether or not the auto-focusing lens assembly has fallen off from the digital camera and whether or not the spring in the auto-focusing lens assembly has fallen off from the digital camera in a better manner and with less manual intervention. In addition, it is able to improve the yield of the digital camera.

Although the above-mentioned steps have been described in order, it should be appreciated that, in order to achieve the mentioned effects, these steps may be performed simultaneously or in different orders, which also falls within the scope of the present disclosure.

It should be further appreciated that, although such expressions as "Step 1" and "Step 2" are used in the appended claims, they shall not be used to limit an order of the steps.

Figure 3:
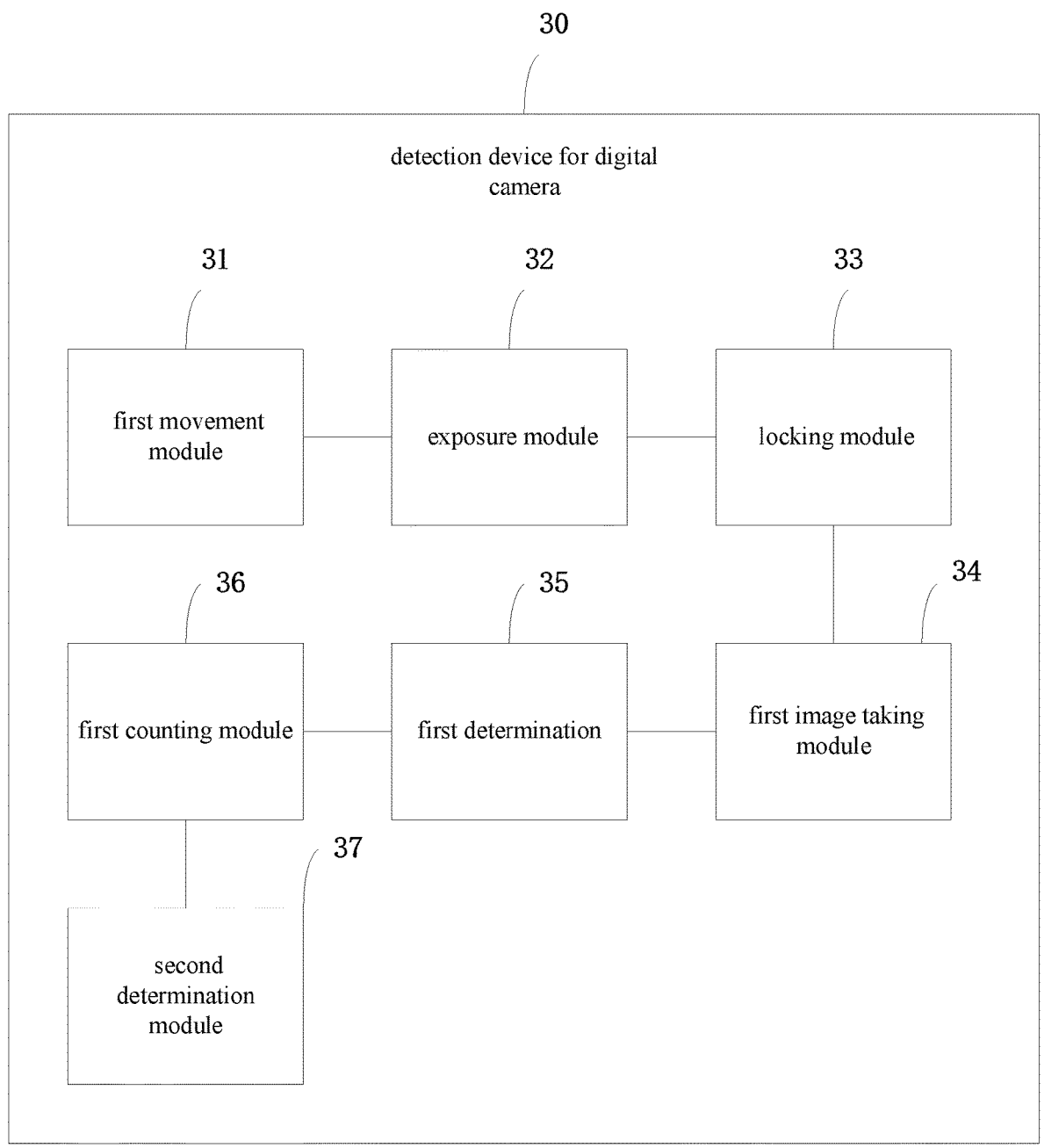
FIG. 3 is a schematic view showing a detection device for a digital camera according to one embodiment of the present disclosure.

Based on an identical inventive concept, the present disclosure further provides in some embodiments a detection device for a digital camera, and the digital camera includes an auto-focusing lens assembly. As shown in FIG. 3, the detection device 30 may at least includes a first movement module 31, an exposure module 32, a locking module 33, a first image taking module 34, a first determination module 35, a first counting module 36 and a second determination module 37.

The first movement module 31 is configured to move the to-be-detected auto-focusing lens assembly to a position spaced apart from a subject by a first distance. The exposure module 32 is configured to perform automatic exposure control until an average luminance value of a central region of an image is in a stable state. The locking module 33 is configured to lock an automatic exposure control parameter. The first image taking module 34 is configured to take a first image. The first determination module 35 is configured to determine sizes of four corner regions in the first image. The first counting module 36 is configured to count average luminance values of the four corner regions. The second determination module 37 is configured to, in the case that the average luminance values of the four corner regions are identical to each other, determine that the to-be-detected auto-focusing lens assembly is installed at an accurate position.

In a possible embodiment of the present disclosure, the detection device may further include a third determination module configured to, in the case that the average luminance values of the four corner regions are different from each other, determine that the to-be-detected auto-focusing lens assembly is not installed at the accurate position.

In a possible embodiment of the present disclosure, the exposure module may further include a measurement module configured to measure the average luminance value of the central region of the image through an area exposure measurement method.

In a possible embodiment of the present disclosure, the detection device may further includes a second counting module, a first calculation module, a fourth determination module, a second calculation module and a third calculation module. The second counting module is configured to count an overall average luminance value of the four corner regions in the first image. The first calculation module is configured to calculate a ratio of the overall average luminance value of the four corner regions to the average luminance value of the central region, so as to acquire a first luminance ratio. The fourth determination module is configured to, in the case that the first luminance ratio is within a first predetermined range, determine that the to-be-detected auto-focusing lens assembly does not fall off from the digital camera. The second calculation module is configured to, with respect to a batch of digital camera samples, calculate the first luminance ratios of these samples. The third calculation module is configured to calculate normal distribution of the first luminance ratios of the samples, so as to acquire the first predetermined range. The first predetermined range is determined by the second calculation module and the third calculation module.

In a possible embodiment of the present disclosure, the detection device may further include a fifth determination module configured to, in the case that the first luminance value is not within the first predetermined range, determine that the to-be-detected auto-focusing lens assembly has fallen off from the digital camera.

In a possible embodiment of the present disclosure, the detection device may further include a second movement module, a second image taking module, a sixth determination module, a fourth calculation module, a seventh determination module, a fifth calculation module and a sixth calculation module. The second movement module is configured to move the to-be-detected auto-focusing lens assembly to a position farthest away from the subject. The second image taking module is configured to take a second image. The sixth determination module is configured to determine an average luminance value of a central region of the second image. The fourth calculation module is configured to calculate a ratio of the average luminance value of the central region of the second image to the average luminance value of the central region of the first image, so as to acquire a second luminance ratio. The seventh determination module is configured to, in the case that the second luminance ratio is within a second predetermined range, determine that a spring in the to-be-detected auto-focusing lens assembly does not fall off from the digital camera. The fifth calculation module is configured to, with respect to a batch of digital camera samples, calculate the second luminance ratios of the sample. The sixth calculation module is configured to calculate normal distribution of the second luminance ratios, so as to acquire the second predetermined range. The second predetermined range is determined by the fifth calculation module and the sixth calculation module.

In a possible embodiment of the present disclosure, the detection device may further include an eighth determination module configured to, in the case that the second luminance ratio is not within the second predetermined range, determine that the spring in the to-be-detected auto-focusing lens assembly has fallen off from the digital camera.

It should be further appreciated that, in the case of detecting the obstacle, the detection device has been illustrated hereinabove merely on the basis of the above functional modules. During the actual application, the above-mentioned functions may be achieved by different functional modules according to the practical need, i.e., the detection device may include different functional modules, so as to achieve all of or parts of the above-mentioned functions.

The above-mentioned device may be used to implement the above-mentioned method, with similar technical principles, similar technical problems to be solved and similar technical effects to be generated. It should be appreciated that, for ease of description, an operating procedure of the device may refer to that mentioned in the embodiments about the method, and thus will not be particularly defined herein.

It should be appreciated that, although the device and the method in the embodiments of the present disclosure have been separately described hereinbefore, details in the embodiments about the device may also be applied to the embodiments about the method. Names of the modules or steps involved in the embodiments of the present disclosure are merely provided to differentiate the modules or steps, but shall not be construed as limiting the scope of the present disclosure. It should be further appreciated that, the modules or steps involved in the embodiments of the present disclosure may be further divided or combined. For example, the above-mentioned modules may be combined into one module, or further divided into more sub-modules.

The technical solutions in the embodiments of the present disclosure have been described in details. Although the principles and implementations have been described with reference to specific embodiments, these embodiments are merely provided to facilitate the understanding of the present disclosure. It should be appreciated that, based on these embodiments, any modification may be made without departing from the scope of the present disclosure.

It should be further appreciated that, the flow charts or block diagrams involved in the embodiments of the present disclosure are not limited to the forms mentioned above, and they may be divided or combined in any possible manner.

It should be further appreciated that, signs and words in the drawings are merely used to facilitate the understanding of the present disclosure, but shall not be construed as limiting the scope of the present disclosure.

Such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. In the case of no any further limitations, for the elements defined by such sentence as "including one . . . ", it is not excluded that the procedure, method, article or device including the elements may also include any other identical elements.

The modules in the embodiments of the present disclosure may be implemented by a general-purpose computing device. For example, they may be integrated into a single computing device, e.g., a person computer, a server computer, a handheld device or a portable device, a flat-panel device or a multiprocessor device, or distributed on a network consisting of a plurality of computing device. They may be used to perform the steps in an order different from that mentioned above. In addition, they may also be manufactured into integrated circuit modules, or parts of them maybe manufactured into a single integrated circuit module. Hence, the present disclosure is not limited to any specific hardware or software or a combination thereof.

The method in the embodiments of the present disclosure may be achieved by a programmable logic device, or implemented as computer program software or a program module (including a routine, a program, an object, a component or data structure capable of executing a specific task or achieving a specific abstract data type). For example, the product in the embodiments of the present disclosure may be a computer program product, which may be executed so as to enable a computer to achieve the steps of the method. The computer program product includes a computer-readable storage medium where a computer program logic or code is stored so as to execute the steps of the method. The computer-readable storage medium may be a medium built in the computer or a medium detachable from the computer (e.g., a hot-swappable storage device). The built-in medium may include, but not limited to, a rewritable nonvolatile memory, e.g., Random Access Memory (RAM), Read Only Memory (ROM), flash memory and hard disk. The detachable medium may include, but not limited to, an optical storage medium (e.g., Compact Disk-Read Only Memory (CD-ROM) and Digital Video Disk (DVD)), a magneto-optical (MO) storage medium, a magnetic storage medium (e.g., magnetic tape or mobile hard disk), a medium having a built-in, rewritable, nonvolatile memory (e.g., a storage card), and a medium having a built-in ROM (e.g., a ROM box).

Although with the above-mentioned descriptions, it should be appreciated that, a person skilled in the art may make various modifications, substitutions or improvements without departing from the spirit of the present disclosure, and these modifications, substitutions or improvements shall also fall within the scope of the present disclosure.

The invention claimed is:

1. A detection method for a digital camera comprising an auto-focusing lens assembly, the detection method comprising steps of:
   Step 1 of moving the to-be-detected auto-focusing lens assembly to a position spaced apart from a subject by a first distance;
   Step 2 of performing automatic exposure control until an average luminance value of a central region of an image is stable;
   Step 3 of locking an automatic exposure control parameter;
   Step 4 of taking a first image;
   Step 5 of determining sizes of four corner regions in the first image;
   Step 6 of counting an average luminance value for each of the four corner regions;
   Step 7 of determining that the to-be-detected auto-focusing lens assembly is installed at an accurate position when the average luminance values for all of the four corner regions are identical;
   Step 8 of counting an overall average luminance value of the four corner regions of the first image;
   Step 9 of calculating a ratio of the overall average luminance value of the four corner regions to the average luminance value of the central region to acquire a first luminance ratio; and
   Step 10 of determining that the to-be-detected auto-focusing lens assembly does not fall off from the digital camera when the first luminance ratio is within a first predetermined range,
   wherein the first predetermined range is determined by a method comprising:
   calculating the first luminance ratios of a plurality of digital camera samples through Steps 1 to 6 and 8 to 9; and calculating a normal distribution of the first luminance ratios of the plurality of digital camera samples to obtain the first predetermined range.

2. The detection method according to claim 1, further comprising: determining that the to-be-detected auto-focusing lens assembly is not installed at the accurate position when the average luminance values of the four regions are not identical.

3. The detection method according to claim 1, further comprising determining that the to-be-detected auto-focusing lens assembly has fallen off from the digital camera when the first luminance ratio is not within the first predetermined range.

4. The detection method according to claim 1, further comprising:

Step 11 of moving the to-be-detected auto-focusing lens assembly to a position farthest away from the subject;

Step 12 of taking a second image;

Step 13 of determining an average luminance value of a central region of the second image;

Step 14 of calculating a ratio of the average luminance value of the central region of the second image to the average luminance value of the central region of the first image to acquire a second luminance ratio;

Step 15 of determining that a spring in the to-be-detected auto-focusing lens assembly does not fall off from the digital camera when the second luminance ratio is within a second predetermined range, wherein the second predetermined range is determined by calculating the second luminance ratios of the plurality of digital camera samples through Steps 1 to 4 and 11 to 14; and calculating a normal distribution of the second luminance ratios of the digital camera samples to determine the second predetermined range.

5. The detection method according to claim 4, further comprising determining that the spring in the to-be-detected auto-focusing lens assembly has fallen off from the digital camera when the second luminance ratio is not within the second predetermined range.

6. The detection method according to claim 1, further comprising:

manually detecting the to-be-detected auto-focusing lens assembly which does not fall off from the digital camera and the spring in the digital camera; and adjusting the first predetermined range and the second predetermined range in accordance with a detection result.

7. A detection device for a digital camera comprising an auto-focusing lens assembly, the detection device comprising:

a first movement module configured to move the to-be-detected auto-focusing lens assembly to a position spaced apart from a subject by a first distance;

an exposure module configured to perform automatic exposure control until an average luminance value of a central region of an image is in a stable state;

a locking module configured to lock an automatic exposure control parameter;

a first image taking module configured to take a first image;

a first determination module configured to determine sizes of four corner regions in the first image;

a first counting module configured to count an average luminance value for each of the four corner regions; and a second determination module configured to determine that the to-be-detected auto-focusing lens assembly is installed at an accurate position when the average luminance values for each of the four corner regions are identical, a second counting module configured to count an overall average luminance value of the four corner regions of the first image;

a first calculation module configured to calculate a ratio of the overall average luminance value of the four corner regions to the average luminance value of the central region, so as to acquire a first luminance ratio;

a fourth determination module configured to determine that the to-be-detected auto-focusing lens assembly does not fall off from the digital camera when the first luminance ratio is within a first predetermined range;

a second calculation module configured to calculate the first luminance ratios of a plurality of digital camera samples; and a third calculation module configured to calculate a normal distribution of the first luminance ratios of the plurality of digital camera samples to determine the first predetermined range, wherein the first predetermined range is determined by the second calculation module and the third calculation module.

8. The detection device according to claim 7, further comprising a third determination module configured to determine that the to-be-detected auto-focusing lens assembly is not installed at the accurate position when the average luminance values for each of the four corner regions are not identical.

9. The detection device according to claim 7, wherein the exposure module comprises a measurement module configured to measure the average luminance value of the central region of the image through an area exposure measurement method.

10. The detection device according to claim 7, further comprising a fifth determination module configured to determine that the to-be-detected auto-focusing lens assembly has fallen off from the digital camera when the first luminance ratio is not within the first predetermined range.

11. The detection device according to claim 7, further comprising:

a second movement module configured to move the to-be-detected auto-focusing lens assembly to a position farthest away from the subject;

a second image taking module configured to take a second image;

a sixth determination module configured to determine an average luminance value of a central region of the second image;

a fourth calculation module configured to calculate a ratio of the average luminance value of the central region of the second image to the average luminance value of the central region of the first image to acquire a second luminance ratio;

a seventh determination module configured to determining that a spring in the to-be-detected auto-focusing lens assembly does not fall off from the digital camera when the second luminance ratio is within a second predetermined range;

a fifth calculation module configured to calculate the second luminance ratios of the plurality of digital camera samples; and a sixth calculation module configured to calculate normal distribution of the second luminance ratios of the plurality of digital camera samples to determine the second predetermined range, wherein the second predetermined range is determined by the fifth calculation module and the sixth calculation module.

12. The detection device according to claim 11, further comprising an eighth determination module configured to determine that the spring in the to-be-detected auto-focusing lens assembly has fallen off from the digital camera when the second luminance ratio is not within the second predetermined range.

\* \* \* \* \*